(12) United States Patent
Nagasaki et al.

(10) Patent No.: US 9,642,163 B2
(45) Date of Patent: May 2, 2017

(54) TRAIN CONTROL DEVICE

(71) Applicant: MITSUBISHI ELECTRIC CORPORATION, Chiyoda-ku (JP)

(72) Inventors: Yusaku Nagasaki, Tokyo (JP); Masashi Asuka, Tokyo (JP); Atsushi Takami, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 90 days.

(21) Appl. No.: 14/386,627

(22) PCT Filed: Jun. 11, 2013

(86) PCT No.: PCT/JP2013/066113
§ 371 (c)(1),
(2) Date: Sep. 19, 2014

(87) PCT Pub. No.: WO2014/002753
PCT Pub. Date: Jan. 3, 2014

(65) Prior Publication Data
US 2015/0078276 A1   Mar. 19, 2015

(30) Foreign Application Priority Data
Jun. 29, 2012  (JP) ................................ 2012-147603

(51) Int. Cl.
B61L 13/00     (2006.01)
H04W 88/08     (2009.01)
(Continued)

(52) U.S. Cl.
CPC ............. H04W 74/04 (2013.01); B60L 15/40 (2013.01); B61L 3/12 (2013.01); B61L 15/0027 (2013.01);
(Continued)

(58) Field of Classification Search
CPC .. B60L 15/40; B60L 2200/26; B61L 15/0027; B61L 23/14; B61L 3/12;
(Continued)

(56) References Cited

U.S. PATENT DOCUMENTS 7,201,350 B2 * 4/2007 Sugita ..................... B61L 3/125
                                                    246/122 R
8,774,992 B2 * 7/2014 Yoshimoto .............. B60L 15/40
                                                      701/117

(Continued)

FOREIGN PATENT DOCUMENTS

JP    2000-229571    8/2000
JP    3424910        7/2003
(Continued)

OTHER PUBLICATIONS

International Search Report issued Jul. 23, 2013 in PCT/JP13/066113 filed Nov. 6. 2013.

Primary Examiner — Ahmed Elallam
(74) Attorney, Agent, or Firm — Oblon, McClelland, Maier & Neustadt, L.L.P.

(57) ABSTRACT

A train control device includes an on-vehicle base station mounted on a train, base stations that can communicate with the on-vehicle base station, an on-vehicle control device controlling an operation such that the train can stop before reaching a stop limit before which the train can run safely, and ground control devices that transmit, to the train side, the stop limit calculated based on information on the current position acquired from the train side via the base stations and opening information on a turnout on the ground. The on-vehicle control device calculates a channel-reservation start pattern, which is a pattern determining a reservation start position of a communication channel of a base station as a switching target when the base station as a communication partner to the on-vehicle base station is switched and in
(Continued)

which the reservation start position is different according to train speed and train position.

6 Claims, 5 Drawing Sheets

(51) Int. Cl.
*H04W 74/04* (2009.01)
*B60L 15/40* (2006.01)
*B61L 3/12* (2006.01)
*B61L 23/14* (2006.01)
*B61L 15/00* (2006.01)
*B61L 27/00* (2006.01)
*H04W 28/26* (2009.01)

(52) U.S. Cl.
CPC ........... *B61L 23/14* (2013.01); *B61L 27/0005* (2013.01); *H04W 28/26* (2013.01); *H04W 88/08* (2013.01); *B60L 2200/26* (2013.01); *Y02T 90/16* (2013.01)

(58) Field of Classification Search
CPC .... B61L 3/008; B61L 27/0027; B61L 25/021; B61L 27/0038; B61L 27/0077; B61L 3/00; H04W 28/26; H04W 74/04; H04W 88/08; Y02T 90/16
See application file for complete search history.

(56) References Cited

U.S. PATENT DOCUMENTS

| | | | |
|---|---|---|---|
| 8,958,396 B2* | 2/2015 | Ishihara | B60L 15/40 370/329 |
| 2003/0105560 A1* | 6/2003 | Sugita | B61L 27/0038 701/19 |
| 2011/0184619 A1* | 7/2011 | Kamata | B60L 15/40 701/70 |
| 2012/0018591 A1* | 1/2012 | Ghaly | B61L 3/008 246/192 R |
| 2012/0320875 A1 | 12/2012 | Ishihara | |
| 2013/0006452 A1* | 1/2013 | Takagi | B60L 15/20 701/20 |
| 2013/0325224 A1* | 12/2013 | Yamamoto | B61L 27/0016 701/20 |
| 2014/0379181 A1* | 12/2014 | Fujimoto | B61L 3/125 701/19 |

FOREIGN PATENT DOCUMENTS

| | | |
|---|---|---|
| JP | 2003-231467 | 8/2003 |
| JP | 3451543 | 9/2003 |
| JP | 2006-240585 | 9/2006 |
| JP | 2008-99233 | 4/2008 |
| JP | 2011-29930 | 2/2011 |
| WO | 2011-101983 | 8/2011 |

* cited by examiner

TRAIN CONTROL DEVICE

FIELD

The present invention relates to a train control device.

BACKGROUND

Conventionally, in a train control device, when a ground base station that serves as a communication partner to an on-vehicle base station is switched at the boundary between ground base stations, a ground control device detects that a train has passed a reservation start point and starts to reserve a communication channel of the next ground based station (see, for example, Patent Literature 1 mentioned below).

CITATION LIST

Patent Literature

Patent Literature 1: Japanese Patent No. 3451543

SUMMARY

Technical Problem

However, with the conventional technique mentioned above, when a train approaches at a low speed to a point where ground base stations are switched, or when there is a station at which trains stop near the switching point, the reservation of a communication channel of the ground base station that is a switching target is made too early. Therefore, in this case, there is a problem in that, at the ground base station that is the switching target, the state of reserving the communication channel becomes too long and thus the use efficiency of the communication channel is degraded.

The present invention has been achieved in view of the above, and an object of the present invention is to provide a train control device that can efficiently use a communication channel while continuing communication.

Solution to Problem

In order to solve the above problems and achieve the object, the present invention relates to a train control device that includes: an on-vehicle base station that is mounted on a train; a ground base station that is installed on a ground and is capable of communicating with the on-vehicle base station; an on-vehicle control device that is mounted on a train, reports a current position of a train to a ground side via the on-vehicle base station, and controls an operation such that a train is capable of being stopped before reaching a stop limit, which the on-vehicle control device has acquired from a ground side and which is a limiting position before which a train is capable of running safely; and a ground control device that is installed on a ground and transmits the stop limit, which is calculated on a basis of information on a current position acquired from a train side via the ground base station and opening information on a turnout on a ground, to a train side via the ground base station, wherein the on-vehicle control device calculates a channel-reservation start pattern, which is a pattern that determines a reservation start position of a communication channel of a ground base station that is a switching target when the ground base station that is a communication partner to the on-vehicle base station is switched and in which the reservation start position is different according to a train speed and a train position.

Advantageous Effects of Invention

According to the present invention, an effect is obtained where a communication channel can be used efficiently while continuing communication.

DESCRIPTION OF EMBODIMENTS

Exemplary embodiments of a train control device according to the present invention will be explained below in detail with reference to the accompanying drawings. The present invention is not limited to the embodiments.

First Embodiment

Figure 1:
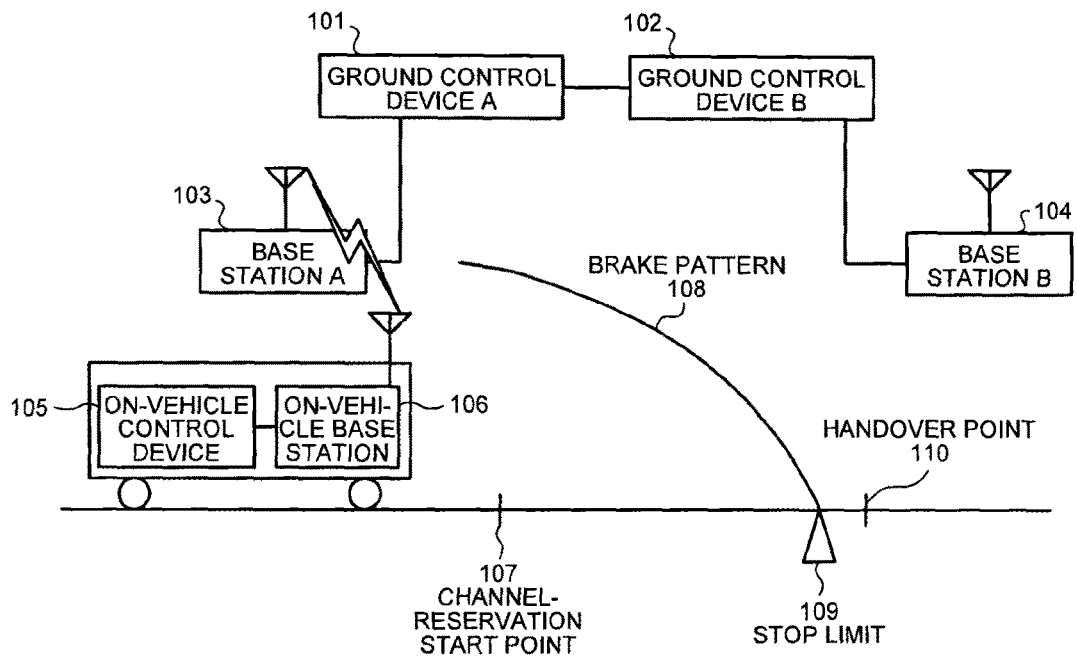
FIG. 1 is a diagram showing a configuration example of a conventional train control device.

First, operations of a conventional train control device are briefly explained. FIG. 1 is a diagram showing a configuration example of a conventional train control device. The train control device includes a ground control device A 101, a ground control device B 102, a base station A 103, and a base station B 104, which are installed on the ground, and an on-vehicle control device 105 and an on-vehicle base station 106, which are mounted on a train.

The ground control device A 101 and the ground control device B 102 are connected to each other by a communication line and control the base station A 103 and the base station B 104. In this example, the number of the ground control devices may be singular or plural, and as for the base station, one ground control device may control a plurality of base stations.

As a general operation, each of the base station A 103 and the base station B 104 performs wireless communication with the on-vehicle base station 106 within its own communication range. The on-vehicle control device 105 reports the current position of a train to the ground side via the on-vehicle base station 106 and controls the operation such that the train can stop before reaching a stop limit 109, which the on-vehicle control device 105 has acquired from the ground side and which is a limiting position before which the train can run safely. The ground control device A 101 and the ground control device B 102 calculate the stop limit 109 on the basis of information on the current position acquired from the train side via respective base stations and opening information on a turnout on the ground, and transmit the calculated stop limit 109 to the train side via the respective base stations.

When a train having mounted thereon the on-vehicle control device 105 and the on-vehicle base station 106 approaches the communication range of the base station B 104 while running within the communication range of the base station A 103, it is necessary to switch the communication partner to the on-vehicle base station 106 from the base station A 103 to the base station B 104. This switching is generally referred to as "handover". The communication-partner switching point where handover is actually performed is specified in advance on a railroad track as a handover point 110. Because there is a case where a plurality of trains are present within the communication range of one base station and these trains communicate with the base station, each of the base stations has a plurality of communication channels. Each of the trains secures any of the communication channels and communicates with a base station. Accordingly, when handover is performed, each of the trains needs to secure a communication channel of a base station that is a switching target.

In the train control device, because communication is used for safety purposes, a breakdown of communication needs to be avoided as much as possible, and when any communication channel of a base station that is a switching target cannot be secured, control is performed such that a train is stopped before it reaches the handover point 110. Accordingly, the stop limit 109 is set before the handover point 110. In order to stop the train before reaching the stop limit 109, the on-vehicle control device 105 calculates a brake pattern 108 and monitors the current speed and position of the train, and when the train is within the brake pattern 108, performs control such that the train is braked and stopped before reaching the stop limit 109. In FIG. 1, as for the brake pattern 108, the horizontal axis indicates a positional relationship and the vertical axis indicates a train speed.

In the actual handover process, a train reserves a communication channel of the base station B 104 in advance when the train has passed a channel-reservation start point 107. When a reservation is made, the on-vehicle control device 105 having received a notification via communication deletes the brake pattern 108, whereby the train enters the handover point 110 and an operation of switching a communication partner is performed.

In the handover process of a conventional train control device, a reservation of a communication channel is started at a time point when a train reaches a certain channel-reservation start point 107, regardless of whether the train approaches the handover point 110 at a high speed or at a low speed. In order to complete the handover process without decelerating the train, even if the train is running at the maximum speed allowed on the railroad track, the position of the channel-reservation start point 107 needs to be set such that a time margin for completing the reserving process of a communication channel before reaching the brake pattern 108 is secured.

This means that, as for a train approaching the handover point 110 at a low speed, a reservation of a communication channel is made at a very early stage. Furthermore, when there is a station between the channel-reservation start point 107 and the handover point 110 and the train stops at the station, a reservation is made much earlier. If a reservation of a communication channel is made too early, the communication channel of the base station B 104 is unnecessarily occupied for a long time, and usage of the communication channel becomes inefficient.

If a license is granted for a dedicated communication band for the wireless train control device, even if the communication channel is occupied for a long time, it is only necessary to secure a large enough bandwidth corresponding to the communication channel and to prepare the number of channels therefor. Accordingly, there is no strong demand for improving the use efficiency of the bandwidth, and it has been sufficient that the starting point of the handover process is fixed at a certain position. However, in recent years, there has been an increasing number of cases where a wireless train control device is realized by using a band that is publicly used for communication regardless of being licensed or not, such as the ISM band. In such cases, there is always a possibility of conflict with communication for other purposes, and thus there has been a strong demand for using a band as efficiently as possible.

Therefore, the present embodiment explains a train control device that executes control of efficiently using a communication channel even in a case where, as mentioned above, a train approaches the handover point 110 at a low speed or a train stops at a station between the channel-reservation start point 107 and the handover point 110.

Figure 2:
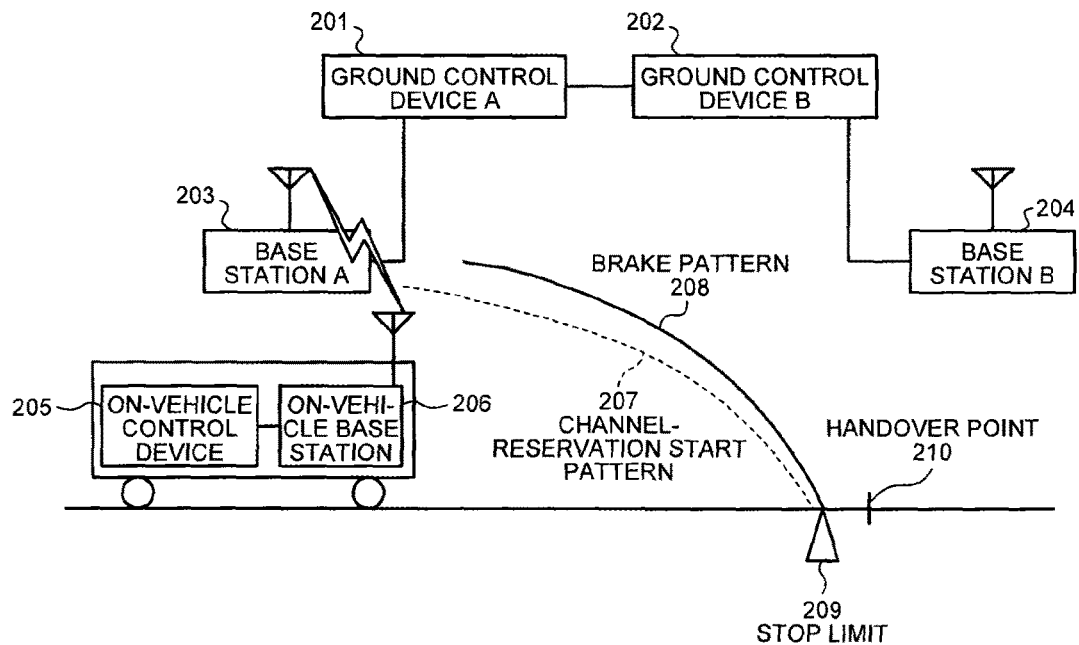
FIG. 2 is a diagram showing a configuration example of a train control device according to a first embodiment.

FIG. 2 is a diagram showing a configuration example of a train control device according to the present embodiment. The train control device includes a ground control device A 201, a ground control device B 202, a base station A 203, a base station B 204, an on-vehicle control device 205, and an on-vehicle base station 206. Except for control based on the channel-reservation start point 107, general operations and connection relationship as a train control device are identical to those of respective constituent elements (the ground control device A 101, the ground control device B 102, the base station A 103, the base station B 104, the on-vehicle control device 105, and the on-vehicle base station 106) of the train control device shown in FIG. 1. Furthermore, a brake pattern 208, a stop limit 209, and a handover point 210 are respectively identical to the brake pattern 108, the stop limit 109, and the handover point 110 shown in FIG. 1.

In the present embodiment, a channel-reservation start pattern 207 is calculated by any of the on-vehicle control device 205, the ground control device A 201, and the ground control device B 202. The channel-reservation start pattern 207 is set such that, when a train runs without changing its speed between the channel-reservation start pattern 207 and the brake pattern 208, an interval is provided in such a way that the time until the train passes the brake pattern 208 after the train passes the channel-reservation start pattern 207 becomes longer than the time required for the reserving process of a communication channel. In the channel-reservation start pattern 207, when a ground base station that serves as a communication partner to the on-vehicle base station 206 is switched, the reservation start position (pattern) of a communication channel of a ground base station that is a switching target is different according to the train speed and the train position. Furthermore, even when the train runs with maximum acceleration after having passed the channel-reservation start pattern 207, it may be arranged such that the reserving process of a communication channel is completed before the train passes the brake pattern 208.

Further, elements that influence acceleration and deceleration of the train due to inclinations or curves of a railroad track may be taken into consideration. Note that, similarly to FIG. 1, as for the brake pattern 208 and the channel-reservation start pattern 207, the horizontal axis indicates a positional relationship and the vertical axis indicates a train speed. When consideration is given on the basis of the distance from the handover point 210 instead of the positions, the concept is completely the same.

In the train control device, when the train approaches the handover point 210, the current position and speed of the train are collated with the channel-reservation start pattern 207, and at a time point when the train passed the channel-reservation start pattern 207, a communication channel of the base station B 204 starts to be reserved. The channel-reservation start pattern 207 is collated with the current position and speed of the train by any of the on-vehicle control device 205, the ground control device A 201, and the ground control device B 202. When a reservation of a communication channel of the base station B 204 is made normally, this information is transmitted to the train via communication; therefore, in the train, the brake pattern 208 is deleted and thus the train keeps running without any deceleration, and the actual handover process is performed at a time point when the train reaches the handover point 210. The handover process is identical to that in a case of the conventional train control device.

Figure 3:
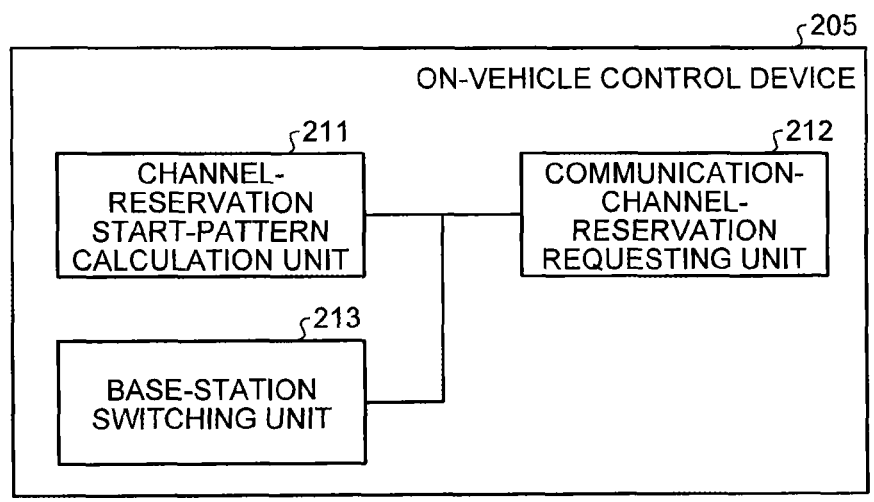
FIG. 3 is a diagram showing a configuration example of an on-vehicle control device according to the first embodiment.

A specific configuration of the on-vehicle control device 205 in a case where the channel-reservation start pattern 207 is calculated is explained here. FIG. 3 is a diagram showing a configuration example of the on-vehicle control device according to the present embodiment. The on-vehicle control device 205 includes a channel-reservation-start-pattern calculation unit 211, a communication-channel-reservation requesting unit 212, and a base-station switching unit 213.

The channel-reservation-start-pattern calculation unit 211 calculates the channel-reservation start pattern 207 on the basis of the train speed and the train position.

When the communication-channel-reservation requesting unit 212 has detected that a train has passed the channel-reservation start pattern 207, the communication-channel-reservation requesting unit 212 transmits a reservation request for a communication channel of a ground base station that is a switching target to a ground control device.

As a response to the reservation request made by the communication-channel-reservation requesting unit 212, the base-station switching unit 213 acquires information on the communication channel of the base station that is a switching target reserved by the ground control device, and performs switching (handover) of a communication partner at the handover point 210.

Accordingly, a request for a communication channel of the next base station can be made at an optimum timing, and communication can be performed efficiently without unnecessarily occupying a communication channel for a long time.

Figure 4:
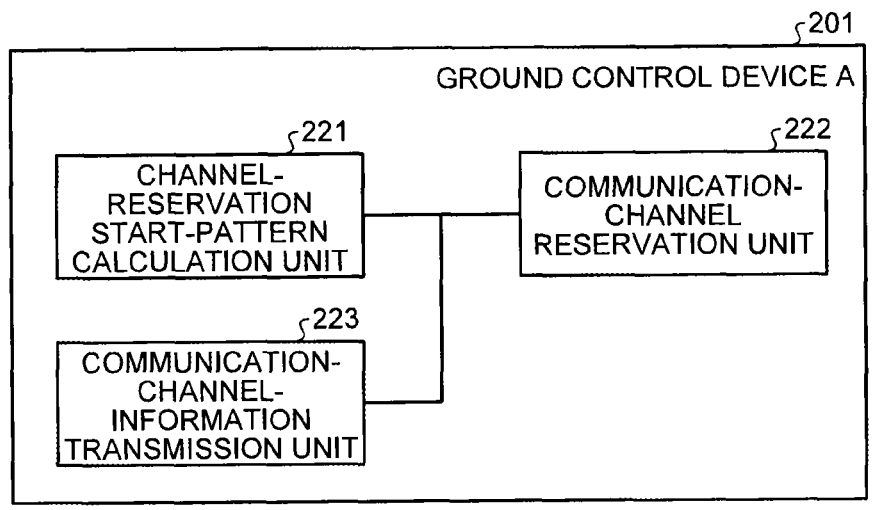
FIG. 4 is a diagram showing a configuration example of a ground control device according to the first embodiment.

A specific configuration of the ground control device A 201 in a case where the channel-reservation start pattern 207 is calculated is explained below. FIG. 4 is a diagram showing a configuration example of a ground control device according to the present embodiment. The ground control device A 201 includes a channel-reservation-start-pattern calculation unit 221, a communication-channel reservation unit 222, and a communication-channel-information transmission unit 223.

When the ground control device B 202 calculates the channel-reservation start pattern 207, the ground control device B 202 has a configuration identical to that of the ground control device A 201.

The channel-reservation-start-pattern calculation unit 221 calculates the channel-reservation start pattern 207 on the basis of the train speed and the train position.

When the communication-channel reservation unit 222 has detected that a train has passed the channel-reservation start pattern 207, the communication-channel reservation unit 222 reserves a communication channel of a ground base station that is a switching target.

The communication-channel-information transmission unit 223 transmits information on the reserved communication channel of the ground base station that is a switching target to the on-vehicle control device 205.

Also in this case, a request for a communication channel of the next base station can be made at an optimum timing, and communication can be performed efficiently without unnecessarily occupying a communication channel for a long time.

Specifically, the channel-reservation-start-pattern calculation units 211 and 221 calculate the channel-reservation start pattern 207 such that the distance that a train runs during the time required for performing the reserving process of a communication channel of a ground base station that is a switching target is maintained with respect to the brake pattern 208 that indicates a relationship between the position of a train determined by the on-vehicle control device in order to stop the train before reaching the communication-partner switching point when a communication channel cannot be reserved at a ground base station that is a switching target and a maximum speed at the point. Accordingly, the train can keep running without deceleration, while securing a communication channel of the next base station at an optimum timing.

As explained above, according to the present embodiment, in the train control device, the on-vehicle control device or the ground control device calculates, on the basis of the speed and position of a train, a channel-reservation start pattern, which is shifted backward with respect to the brake pattern by the time required for the reserving process of a communication channel. By making the time point at which a channel starts to be reserved variable according to the speed and position of a train without fixing it, a communication channel of the next base station can be reserved at an optimum timing regardless of the speed of a train at which the train approaches a handover point. Accordingly, even in a case where a train runs at a low speed or stops before reaching a handover point, it is possible to avoid a communication channel from being unnecessarily occupied for a long time, and the communication channel can be used efficiently.

Second Embodiment

In the conventional train control device, after completing handover, it is not clear as to what time point a communication channel of a base station that is a handover source is released. It is supposed that, in general, a communication channel of a base station that is a handover source is released immediately after completing handover. However, with this method, if a train stops at a point immediately after passing a handover point and then starts to run in the reverse direction, there is a possibility that the timing of the handover process in the reverse direction is too late. Therefore, in the present embodiment, releasing of a communication channel is controlled by using a channel releasing pattern. The present embodiment explains portions different from those of the first embodiment.

Figure 5:
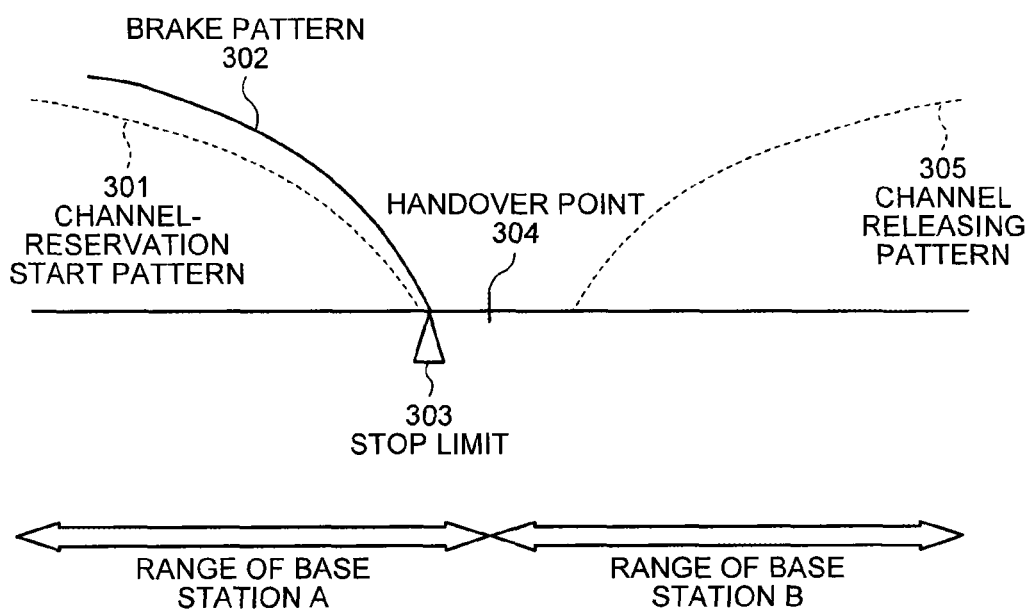
FIG. 5 is a diagram showing a concept of a handover point, a stop limit, and respective patterns with respect to a train in a second embodiment.

FIG. 5 is a diagram showing a concept of a handover point, a stop limit, and respective patterns with respect to a train in the present embodiment. The connection relationship among respective constituent elements, such as ground control devices, base stations, and an on-vehicle control device and an on-vehicle base station, which are mounted on a train, is identical to that of the first embodiment (see FIG. 2). A channel-reservation start pattern 301, a brake pattern 302, a stop limit 303, and a handover point 304 are respectively identical to the channel-reservation start pattern 207, the brake pattern 208, the stop limit 209, and the handover point 210, which are shown in FIG. 2. The communication range of a base station A and that of a base station B are separated at the handover point 304, which is a boundary therebetween.

In the present embodiment, any of the on-vehicle control device, a ground control device A, and a ground control device B further calculates a channel releasing pattern 305 in the range of the base station B, which is beyond the handover point 304. A train that performs handover from the base station A to the base station B starts to reserve a communication channel of the base station B on the basis of the channel-reservation start pattern 301, and after securing a communication channel, the train passes the handover point 304 in a state where the communication channels of both the base stations are secured and switches the communication channel used for communication at this time point from the communication channel of the base station A to that of the base station B. Thereafter, in this train, the communication channel of the base station A is released at a time point when the train passed the channel releasing pattern 305. Similarly to FIGS. 1 and 2, as for the channel-reservation start pattern 301, the brake pattern 302, and the channel releasing pattern 305, the horizontal axis indicates a positional relationship and the vertical axis indicates a train speed. This holds true in the following embodiments.

To put it simply, it suffices that the channel releasing pattern 305 is developed on the base station B side such that it is symmetrical with the channel-reservation start pattern 301. In this case, the channel releasing pattern 305 matches a channel-reservation start pattern of a train that performs handover from the base station B to the base station A and runs in the opposite direction. If the train has already passed this channel releasing pattern, when the direction in which the train runs changes to the reverse direction, the train inevitably passes a channel-reservation start pattern in the reverse direction; therefore, it can be guaranteed that the handover process in the reverse direction is performed normally. That is, when the train reverses its direction at a point closer to the handover point 304 than the channel releasing pattern 305, a breakdown of communication does not occur because the communication channels of both the base stations are still secured. When the train reverses its direction after passing the channel releasing pattern 305, the communication channel of the base station A is once released; however, the train reaches the handover point 304 after a reservation of a communication channel is made again. Thus, a breakdown of communication does not occur even in this case.

At the time of calculating the channel releasing pattern 305, when conditions, such as curves or inclinations of a railroad track, are also taken into consideration, the channel-reservation start pattern 301 and the channel releasing pattern 305 are not always symmetrical about the handover point 304. In this case, the channel releasing pattern 305 is calculated such that the pattern becomes identical to the channel-reservation start pattern at the time of performing handover from the base station B to the base station A.

Figure 6:
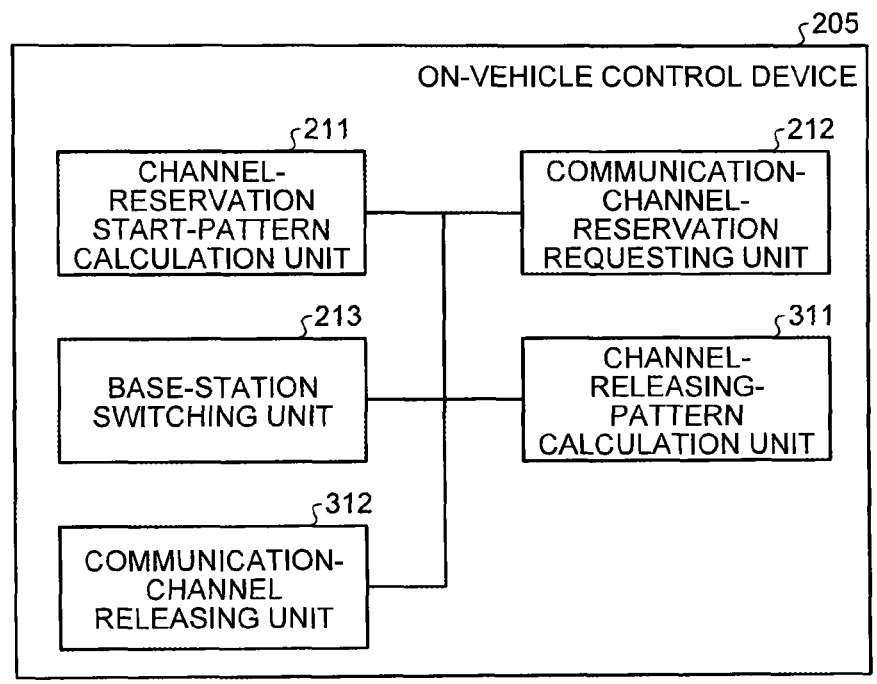
FIG. 6 is a diagram showing a configuration example of an on-vehicle control device according to the second embodiment.

A specific configuration of the on-vehicle control device in a case where the channel releasing pattern 305 is calculated is explained here. FIG. 6 is a diagram showing a configuration example of the on-vehicle control device according to the present embodiment. The on-vehicle control device 205 includes the channel-reservation-start-pattern calculation unit 211, the communication-channel-reservation requesting unit 212, the base-station switching unit 213, a channel-releasing-pattern calculation unit 311, and a communication-channel releasing unit 312.

The channel-releasing-pattern calculation unit 311 calculates the channel releasing pattern 305 that determines the position where a communication channel of a ground base station (the base station A) that is a switching source is released after performing switching of a ground base station that is a communication partner to an on-vehicle base station on the basis of the train speed and the train position.

When the communication-channel releasing unit 312 has detected that a train has passed the channel releasing pattern 305, the communication-channel releasing unit 312 releases the communication channel of the ground base station (the base station A) that is a switching source.

Accordingly, the communication channel of the base station that is a switching source can be released at an optimum timing; therefore, even when a train reverses its direction near a switching point, communication can be securely continued.

Figure 7:
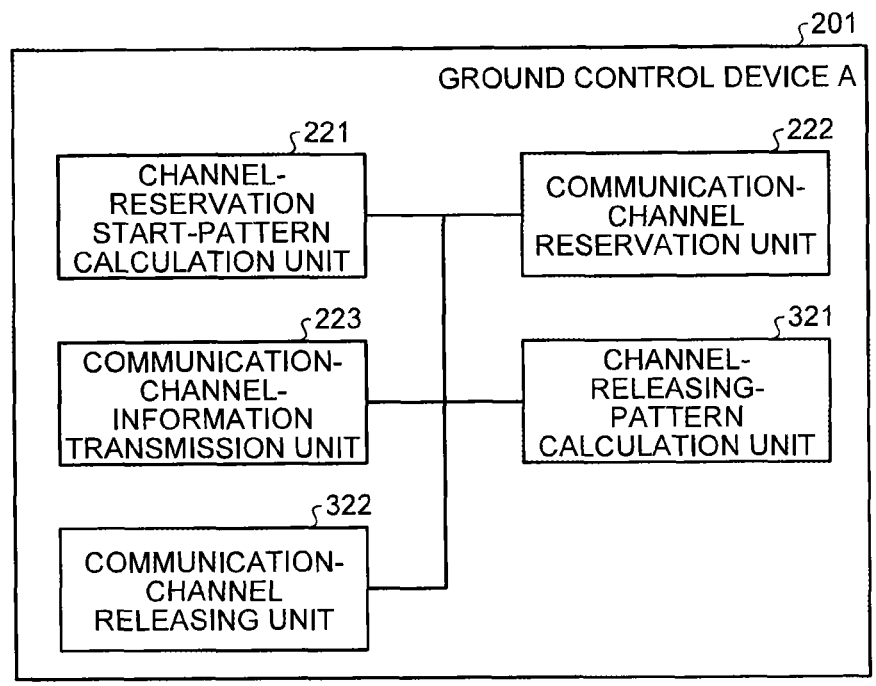
FIG. 7 is a diagram showing a configuration example of a ground control device according to the second embodiment.

A specific configuration of the ground control device A in a case where the channel releasing pattern 305 is calculated is explained here. FIG. 7 is a diagram showing a configuration example of the ground control device according to the present embodiment. The ground control device A 201 includes the channel-reservation-start-pattern calculation unit 221, the communication-channel reservation unit 222, the communication-channel-information transmission unit 223, a channel-releasing-pattern calculation unit 321, and a communication-channel releasing unit 322. When the ground control device B calculates the channel releasing pattern 305, the ground control device B has a configuration identical to that of the ground control device A.

The channel-releasing-pattern calculation unit 321 calculates the channel releasing pattern 305 that determines the position where a communication channel of a ground base station (the base station A) that is a switching source is released after performing switching of a ground base station that is a communication partner to an on-vehicle base station on the basis of the train speed and the train position.

When the communication-channel releasing unit 322 has detected that a train has passed the channel releasing pattern 305, the communication-channel releasing unit 322 releases the communication channel of the ground base station (the base station A) that is a switching source.

Even in this case, the communication channel of the base station that is a switching source can be released at an optimum timing; therefore, even when a train reverses its direction near a switching point, communication can be securely continued.

As explained above, according to the present embodiment, the train control device sets a channel releasing pattern that determines the position where a communication channel of a ground base station that is a switching source is released after performing switching of a ground base station that is a communication partner to an on-vehicle base station and releases a communication channel of a base station that has been connected and is a switching source after a train passes the channel releasing pattern. Accordingly, a communication channel of a base station can be appropriately secured to continue communication, regardless of the movement of the train, such as deceleration or stoppage of the train near a handover point.

Third Embodiment

In the present embodiment, a communication channel is released earlier to improve the use efficiency of the communication channel. The present embodiment explains portions different from those of the second embodiment.

Figure 8:
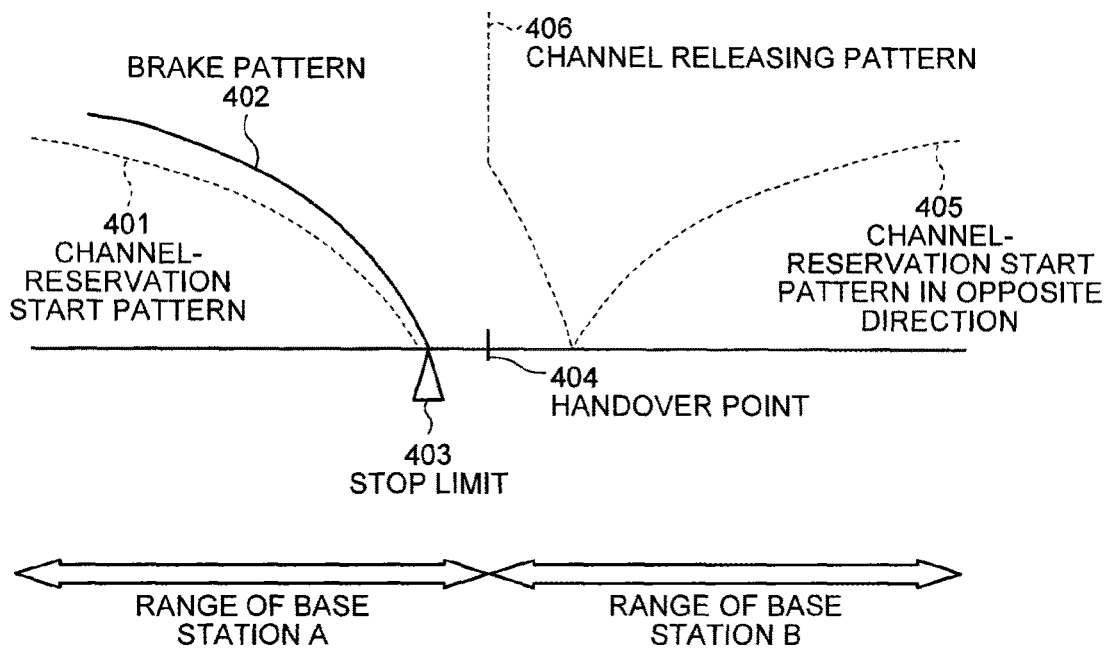
FIG. 8 is a diagram showing a concept of a handover point, a stop limit, and respective patterns with respect to a train in a third embodiment.

FIG. 8 is a diagram showing a concept of a handover point, a stop limit, and respective patterns with respect to a train in the present embodiment. The connection relationship among respective constituent elements, such as ground control devices, base stations, and an on-vehicle control device and an on-vehicle base station, which are mounted on a train, is identical to those of the first and second embodiments (see FIG. 2). A channel-reservation start pattern 401, a brake pattern 402, a stop limit 403, and a handover point 404 are respectively identical to the channel-reservation start pattern 301, the brake pattern 302, the stop limit 303, and the handover point 304, which are shown in FIG. 5. The communication range of the base station A and that of the base station B are separated at the handover point 404, which is a boundary therebetween.

In the present embodiment, any of the on-vehicle control device, the ground control device A, and the ground control device B calculates a channel-reservation start pattern 405 in the opposite direction, which is used at the time of performing handover from the base station B to the base station A, and further calculates a channel releasing pattern 406. The communication channel of the base station A is released at a time point when a train passed the channel releasing pattern 406.

When handover from the base station A to the base station B is performed, the train is running at a certain speed; therefore, if the train is braked with a maximum deceleration speed after the handover, the train still runs for a certain distance until it stops. At the time point when the train stops, if the train is outside the channel-reservation start pattern 405 in the opposite direction as viewed from the handover point 404, it can be guaranteed that, thereafter, when the train starts to run in the reverse direction, the channel reserving process can be started after the train passes the channel-reservation start pattern 405 in the opposite direction.

Therefore, any of the on-vehicle control device, the ground control device A, and the ground control device B calculates the channel releasing pattern 406 in accordance with the relationship between the position and speed of the train with which the train definitely runs outside the channel-reservation start pattern 405 in the opposite direction even if the train is braked with a maximum deceleration speed. Specifically, if the channel releasing pattern 406 is calculated on the basis of the maximum deceleration speed during braking (maximum deceleration curve) from the point where the speed in the channel-reservation start pattern 405 in the opposite direction becomes zero, such a channel releasing pattern 406 can be obtained. Note that, because the communication channel of the base station A cannot be released before the train reaches the handover point 404, the channel releasing pattern 406 is calculated such that the communication channel is released at the handover point 404 when the train is running at a predetermined speed or higher.

As for the brake pattern 402, if a reservation of a communication channel cannot be correctly made, it is necessary to definitely stop the train before it reaches the stop limit 403; therefore, the brake pattern 402 is calculated while it is assumed that the deceleration speed is lower than the maximum deceleration speed of the train so that there will be no problem even under a condition where the deceleration speed of the train is lowered due to rain or the like. Meanwhile, as for the channel releasing pattern 406, because it is more problematic that the train is stopped at a location that is closer to the handover point 404 than the channel-reservation start pattern 405 in the opposite direction, the channel releasing pattern 406 is calculated while it is assumed that the deceleration speed is higher than the maximum deceleration speed of the train.

In the configurations shown in FIG. 6 and FIG. 7, specifically, in the channel-releasing-pattern calculation units 311 and 321 of the on-vehicle control device or the ground control device, the channel releasing pattern 406 is calculated on the basis of the maximum deceleration curve of a train in which the point that is further than the channel-reservation start pattern 405 in the opposite direction of the train running in the opposite direction from the handover point 404 is the position at which the train stops and on the basis of the information on the handover point 404.

As explained above, according to the present embodiment, in the train control device, a channel releasing pattern is calculated in accordance with the relationship between the position and speed of the train with which the train definitely runs outside a channel-reservation start pattern in the opposite direction of a base station that is a handover target even if the train is braked with a maximum deceleration speed. Accordingly, even if the train stops and reverses its direction near a handover point, there is no possibility that the train enters the range of another base station without securing a communication channel. Accordingly, communication can be securely continued, and it becomes possible to release a communication channel of a base station that is a handover source as soon as possible, thereby improving the use efficiency of the communication channel.

Fourth Embodiment

In the present embodiment, releasing of a communication channel while taking the train length into consideration is explained. The present embodiment explains portions different from those of the third embodiment.

In a train control device, if the position of a train is measured at the head position of the train, when the direction in which the train runs is reversed, the reference point for measuring the train position is shifted by the train length. When this shifting is taken into consideration, even if the train stops immediately after a communication channel of a handover source is released according to a channel releasing pattern, the direction in which the train runs is reversed to the opposite direction, and then the reference point for measuring the train position is shifted by the train length, the train needs to be located at a point further than a channel-reservation start pattern in the opposite direction from a handover point. That is, it is necessary to have a distance determined by the train length between the channel releasing pattern and the channel-reservation start pattern in the opposite direction.

Figure 9:
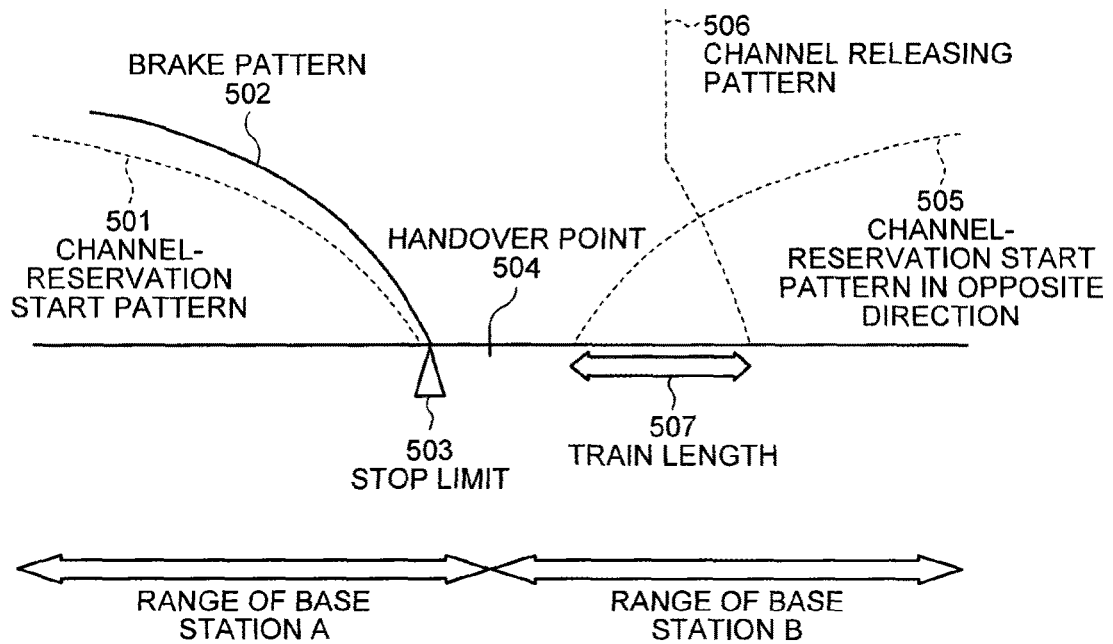
FIG. 9 is a diagram showing a concept of a handover point, a stop limit, and respective patterns with respect to a train in a fourth embodiment.

FIG. 9 is a diagram showing a concept of a handover point, a stop limit, and respective patterns with respect to a train in the present embodiment. The connection relationship among respective constituent elements, such as ground control devices, base stations, an on-vehicle control device and an on-vehicle base station, which are mounted on a train, is identical to those of the first to third embodiments (see FIG. 2). A channel-reservation start pattern 501, a brake pattern 502, a stop limit 503, a handover point 504, and a channel-reservation start pattern 505 in the opposite direction are respectively identical to the channel-reservation start pattern 401, the brake pattern 402, the stop limit 403, the handover point 404, and the channel-reservation start pattern 405 in the opposite direction, which are shown in FIG. 8. The communication range of the base station A and that of the base station B are separated at the handover point 504, which is a boundary therebetween.

In the present embodiment, any of the on-vehicle control device, the ground control device A, and the ground control device B calculates the channel-reservation start pattern 505 in the opposite direction, which is used at the time of performing handover from the base station B to the base station A, and further calculates a channel releasing pattern 506. The communication channel of the base station A is released at a time point when a train passed the channel releasing pattern 506.

In this case, as compared to the channel releasing pattern 406 according to the third embodiment (see FIG. 8), the channel releasing pattern 506 is shifted to a point further from the handover point 504 by a train length 507. Accordingly, even if a train stops immediately after passing the channel releasing pattern 506 and the direction in which the train runs is reversed to the opposite direction, the head position of the train is at a point further than the channel-reservation start pattern 505 in the opposite direction from the handover point 504. Therefore, a reservation of a communication channel can be started correctly when the train has started to move.

In FIG. 9, in a high speed area in the channel releasing pattern 506, a pattern that performs releasing at the same position even if the speed becomes higher is calculated on the assumption that, even when the head of the train enters the range of the base station B, the communication channel of the base station A is not released until the tail of the train completely comes out of the range of the base station A. If there is no problem with releasing a communication channel even when the tail of the train is still in the range of the base station A, the channel releasing pattern 506 can be represented by a curve based on the maximum deceleration speed of the train in its entirety. Note that, even in this case, the channel releasing pattern 506 is represented by a curve that does not release the communication channel when the head of the train is within the range of the base station A.

In the configurations shown in FIG. 6 and FIG. 7, specifically, in the channel-releasing-pattern calculation units 311 and 321 of the on-vehicle control device or the ground control device, the channel releasing pattern 506 is calculated at a point further from the handover point 504 by the train length 507.

As explained above, according to the present embodiment, in the train control device, a channel releasing pattern is calculated while the train length is also taken into consideration. Accordingly, even if the train stops and reverses its direction near a handover point, there is no possibility that the train enters the range of another base station without securing a communication channel. Accordingly, communication can be securely continued, and it becomes possible to release a communication channel of a base station that is a handover source as soon as possible, thereby improving the use efficiency of the communication channel.

INDUSTRIAL APPLICABILITY

As described above, the train control device according to the present invention is useful in a configuration having a plurality of ground base stations, and is particularly suitable for control in which a train switches a ground base station that is a communication partner.

REFERENCE SIGNS LIST 101, 201 ground control device A, 102, 202 ground control device B, 103, 203 base station A, 104, 204 base station B, 105, 205 on-vehicle control device, 106, 206 on-vehicle base station, 107 channel-reservation start point, 108, 208, 302, 402, 502 brake pattern, 109, 209, 303, 403, 503 stop limit, 110, 210, 304, 404, 504 handover point, 207, 301, 401, 501 channel-reservation start pattern, 211, 221 channel-reservation-start-pattern calculation unit, 212 communication-channel-reservation requesting unit, 213 base-station switching unit, 222 communication-channel reservation unit, 223 communication-channel-information transmission unit, 305, 406, 506 channel releasing pattern, 311, 321 channel-releasing-pattern calculation unit, 312, 322 communication-channel releasing unit, 405, 505 channel-reservation start pattern in opposite direction, 507 train length.

The invention claimed is:

1. A train control apparatus comprising:
an on-vehicle base station that is mounted on a train;
a ground base station that is installed on a ground and is capable of communicating with the on-vehicle base station;
an on-vehicle control device that is mounted on the train, reports a current position of the train to the ground base station via the on-vehicle base station, and controls an operation such that the train is capable of being stopped before reaching a stop limit, which the on-vehicle control device has acquired from the ground base station via the on-vehicle base station and which is a limiting position before which the train is capable of running safely; and
a ground control device that is installed on the ground and transmits the stop limit, which is calculated on a basis of information on the current position acquired from the on-vehicle control device via the on-vehicle base station and the ground base station, to the on-vehicle control device via the on-vehicle base station and the ground base station, wherein
the on-vehicle control device, when the ground base station that is a communication partner to the on-vehicle base station is switched, includes
a channel-releasing-pattern calculation unit that calculates a channel releasing pattern that determines a position where a communication channel of the ground base station that is a switching source is released after performing switching of the ground base station that is a communication partner to the on-vehicle base station on a basis of a train speed and a train position, and
a communication-channel releasing unit that, when detecting that the train has passed the channel releasing pattern, releases the communication channel of the ground base station that is a switching source.

2. The train control apparatus according to claim 1, wherein when a pattern which determines a reservation start position of a communication channel of the ground base station that is a switching target and in which the reservation start position is different according to the train speed and the train position is a channel-reservation start pattern, the channel-releasing-pattern calculation unit calculates the channel releasing pattern on a basis of a maximum deceleration curve of the train in which a point that is further than a channel-reservation start pattern of a train running in an opposite direction from a communication partner switching point is a position at which the train stops and on a basis of information on the communication partner switching point.

3. The train control apparatus according to claim 2, wherein the channel-releasing-pattern calculation unit calculates the channel releasing pattern at a point further from the communication partner switching point by a total length of the train.

4. A train control apparatus comprising:
an on-vehicle base station that is mounted on a train;
a ground base station that is installed on a ground and is capable of communicating with the on-vehicle base station;
an on-vehicle control device that is mounted on the train, reports a current position of the train to the ground base station via the on-vehicle base station, and controls an operation such that the train is capable of being stopped before reaching a stop limit, which the on-vehicle control device has acquired from the ground base station via the on-vehicle base station and which is a limiting position before which the train is capable of running safely; and
a ground control device that is installed on the ground and transmits the stop limit, which is calculated on a basis of information on the current position acquired from the on-vehicle control device via the on-vehicle base station and the ground base station, to the on-vehicle control device via the on-vehicle base station and the ground base station, wherein
the ground control device, when the ground base station that is a communication partner to the on-vehicle base station is switched, includes
a channel-releasing-pattern calculation unit that calculates a channel releasing pattern that determines a position where a communication channel of the ground base station that is a switching source is released after performing switching of the ground base station that is a communication partner to the on-vehicle base station on a basis of a train speed and a train position, and
a communication-channel releasing unit that, when detecting that the train has passed the channel releasing pattern, releases the communication channel of the ground base station that is a switching source.

5. The train control apparatus according to claim 4, wherein when a pattern which determines a reservation start position of a communication channel of the ground base station that is a switching target and in which the reservation start position is different according to the train speed and the train position is a channel-reservation start pattern, the channel-releasing-pattern calculation unit calculates the channel releasing pattern on a basis of a maximum deceleration curve of the train in which a point that is further than a channel-reservation start pattern of a train running in an opposite direction from a communication partner switching point is a position at which the train stops and on a basis of information on the communication partner switching point.

6. The train control apparatus according to claim 5, wherein the channel-releasing-pattern calculation unit calculates the channel releasing pattern at a point further from the communication partner switching point by a total length of the train.

\* \* \* \* \*